(12) United States Patent
Goldrian et al.

(10) Patent No.: US 7,197,540 B2
(45) Date of Patent: Mar. 27, 2007

(54) CONTROL LOGIC IMPLEMENTATION FOR A NON-BLOCKING SWITCH NETWORK

(75) Inventors: Gottfried A. Goldrian, Boeblingen (DE); Bernd Leppla, Buchen-Boedigheim (DE); Norbert Schumacher, Neuhausen (DE); Francois Abel, Rueschlikon (CH); Ronald P. Luijten, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 10/093,920

(22) Filed: Mar. 8, 2002

(65) Prior Publication Data

US 2002/0152263 A1    Oct. 17, 2002

(30) Foreign Application Priority Data

Mar. 9, 2001    (EP)    ................................. 01105964

(51) Int. Cl.
*G06F 15/167* (2006.01)
(52) U.S. Cl. .................... 709/213; 709/214; 711/200
(58) Field of Classification Search ................ 709/213, 709/214, 206; 711/200, 5; 370/360
See application file for complete search history.

(56) References Cited

U.S. PATENT DOCUMENTS

| | | | | |
|---|---|---|---|---|
| 5,924,111 | A * | 7/1999 | Huang et al. | ................... 711/5 |
| 6,366,289 | B1 * | 4/2002 | Johns | .......................... 345/543 |
| 6,657,998 | B2 * | 12/2003 | Li | .............................. 370/360 |
| 2003/0046429 | A1 * | 3/2003 | Sonksen | ..................... 709/246 |

* cited by examiner

*Primary Examiner*—Jason Cardone
*Assistant Examiner*—Adnan M. Mirza
(74) *Attorney, Agent, or Firm*—John E. Campbell; Floyd A. Gonzalez

(57) ABSTRACT

The present invention relates to switching technology in computer networks and in particular to a method and system for switching information packets through a m input, n output device. According to the invention it is proposed to temporarily buffer said packets according to a new, self-explanatory, preferred a linear addressing scheme in which a respective buffer location of consecutive stream packets results from a respective self-explanatory, or linear, respectively, incrementation of a buffer pointer. Preferably, a matrix of FIFO storage elements (10,11,12,13) having an input and an output crossbar can be used for implementing input/output paralleling modes (ILP,OLP) and multiple lanes and achieving address input/output scaling up to a single cycle.

14 Claims, 11 Drawing Sheets

CONTROL LOGIC IMPLEMENTATION FOR A NON-BLOCKING SWITCH NETWORK

BACKGROUND OF THE INVENTION

The present invention relates to switching technology in computer networks. More particularly it refers to a method and system for switching information packets through a multiple (m) input, multiple (n) output device.

During the last years the data traffic through electronic networks has increased remarkably. This tendency was strongly triggered by the general acceptance and frequent use of the Internet by private persons and enterprises.

In general, the data is transferred in packets from the start node to the end node of a respective data transmission. Between start node and end node in general, a plurality of nodes are used during packet transmission at which a packet is routed in one—when monocast—and into several directions—when multicast transmission—in order to arrive finally at the end node.

At any intermediate node a kind of switching device having a number of m input ports and a number of n output ports routs the packets according to the intended target node. The physical line onto which this is done is called a link. Thus, in a network nodes are connected by one or more links which are often full duplex links which allow simultaneous communications in both directions. Both ends of each link are terminated by a 'link-circuit' which is also called a port.

A switch is thus a key component of the entire network. It is called non-blocking when it can simultaneously interconnect several pairs of selected links. It is also called a cut-through switch when it can begin re-transmitting (i.e., forwarding) data packets well before the complete packet has been received. In European patent application EP 0404423 a respective disclosure can be found related to the specific prior art network switches. This disclosure is incorporated herein by reference. In order to increase the throughput through such switching devices a modern switching device supports the so-called link paralleling mode (LP mode) in which temporarily several ports, for example up to 4 ports build one logical port. This is done in order to virtually and temporarily increase the bandwidth of a selected link.

Further, a modern switch supports more then one switching priorities, further referred to herein as lanes.

A disadvantage of switches supporting link paralleling mode and multiple lanes is their latency, i.e. the time between the packet arrival and the packet departure.

The problem concerned with the present invention is now in more detail the following: The basic principle of any packet switch network is to route incoming packets from any of the input ports n to one or more of the m output ports while maintaining the sequence of the packet flow. Thus, when a data transmission comprises 47 single packets, for example, the sequence of them must be tracked precisely in order to being able to built up the desired data at the target node computer in the same way as it was sent from the originating computer.

In prior art this control job is done by so-called 'linked lists' which keep precisely track of the packet sequence. This is done in prior art by an address manager which provides to each incoming packet an address at which this packet is stored in memory. This, however, is only done when the traffic amount exceeds a certain limit and a data packet must be buffered temporarily before it can be sent out to the desired output port. The basic principle of the linked list concept is to store the address location of the subsequent packet with the current address location. This concept has, however some disadvantages, as reveals next below.

When trying to increase the throughput performance by using a higher performing server computer processor having a higher clock rate than that one used before, the linked list approach represents a significant obstacle for the expected throughput increase because the walking through the linked list required for routing the complete packet sequences requires in turn a read process of a packet, each.

A further disadvantage of the linked list approach is that a whole packet sequence must be sent a second time when a single address control bit used in the linklist addressing scheme has lost the correct value, may be generated by a hardware error. Then, the sequence is interrupted and the packet subsequent to the current packet can not be found anymore in the switch memory.

Thus, it would be desirable to have a switching device which is able to increase the throughput with increasing clockrate.

SUMMARY OF THE INVENTION

It is thus the objective of the present invention to manage the information packets in a way in which a principally unlimited number of them can be processed in a pipeline on a single-cycle base, i.e., such that in every cycle packets can be input, and output, respectively.

These objects of the invention are achieved by the features stated in enclosed independent claims. Further advantageous arrangements and embodiments of the invention are set forth in the respective subclaims.

The key idea of the present invention is to use a linear addressing scheme instead of the prior art linked list addressing scheme. The term 'linear' is to be understood in terms of easy-to-track pointer movements. In other words, a linear addressing scheme means to buffer something at storage locations which can be specified by any programmable formula describing a linear context between any subsequent locations as e.g., 0, 4, 8, . . . 1020, . . . 1021, . . . , 3, 7, 11, 1023 in a storage comprising 1024 storage locations. Thus, the addressing scheme is self-explanatory in the sense that it is possible to build up a sequence of locations which is always the same for a given operation mode independent of any current storage occupancy. Thus, any linear incrementation (0, 9, 16, 24, . . . 1016, . . . 7, 15, 23, . . . 1023) of an access-pointer which is used for retrieving the address location of the next packet from a current packet would be comprised of said linear, self-explaining addressing scheme.

Thus, a preferred addressing scheme is the FIFO-order in which the data addresses for incoming packets are stored instead of storing the respective next-pointer addresses.

Basically such an addressing scheme, and in particular a FIFO can be advantageously built up with a Compilable Register Array (CRA), which is a dense register file with asynchronous write and read functions. Such register arrays provide a physically dense solution as well as a high performance solution for small multiport arrays by avoiding the overhead of Array-Built-in Self Test. In such CRA one write and read pointer keep track of the next write and next read location.

In order to provide multiple lanes there is one FIFO provided for each lane in order to maintain the sequence.

In order to support the feature of link paralleling, a respective plurality of, e.g., 4 FIFOs per lane are used for a four-times link paralleling mode (LP4–mode).

The basic advantage is that now a plurality of, e.g., 4 addresses—when supporting an LP4–mode can be accessed within one cycle for read and for write because according to the present invention the addresses themselves and not the next pointer information is buffered and a concurrent access to for example 4 FIFOs can be done within every cycle. Thus there is a straight-forward, direct way for retrieving the packet sequence for reading out from the device, because they were stored before according to a simple storage addressing scheme.

In order to optimize the throughput in link paralleling modes, for example twofold, fourfold, etc.—in general i-fold—it is proposed to use a i×i crossbar in front of the FIFOS in order to re-arrange the addresses. Therefor a so-called position write pointer comprising 5+2 bits is provided in order to keep track of the stored information. 5 bits are needed for encoding e.g., 32 address bit locations within one FIFO each whereas the 2 bits are used for encoding the input port number in case of 4 input ports.

Thus, having now sketched out in summary the advantageous features of the present invention the appended claims should now be referred to in order to appreciate the scope of the present invention.

According to the primary aspect of the invention a method is provided for switching information packets resulting from an input stream incoming at a plurality of m input ports in a switching device to a plurality of n output ports of said device according to predetermined rules, i.e., defined by any kind of routing preprocessor. Said method is characterized by the step of temporarily buffering said packets according to a self-explanatory, preferred a linear addressing scheme in which a respective buffer location of consecutive stream packets results from a respective self-explanatory, or linear, respectively, incrementation of a buffer pointer. In this context the term 'self-explaining' or the term 'linear' is to be understood in a quite general sense, such that it covers any regularly built-up arrangement of buffer locations.

By this measure the latency can be reduced remarkably. In the example disclosed further below the latency is reduced by a factor of 4, i.e. 4 reads or 4 writes are supported in every cycle. Thus, any highly clocked server processor can be used in order to produce a continuous flow of data packets in which in every single cycle packets can be received at the incoming ports and can be sent out at the output ports.

Since latency is a key issue for server applications this kind of control is now in the position to fulfill both, communication and server requirements. Further, the FIFO principle is logically much more simpler than the prior art link list ordering scheme. Further, this kind of control can support packet cycles which are smaller than 4. Further, the inventive solution needs only approximately 4 times more chip area, for example CRA area compared to the linked list approach, and a number of multiplexers can be saved. Thus, the additional area consumption is negligible compared to the performance gain. Further, the inventional concept opens up a future performance gain implied by future even higher clocked processors without any requirement to change the addressing scheme. Thus, the addressing scheme proposed in here is further able to be run with clock rates higher than three to five Gigahertz.

Considering the error behavior the inventive solution allows to get rid of only one erroneous entry instead of invalidating the entire linked list at it is required in prior art.

Further, the inventive concept is able to support a built-in Error Correction Code (ECC).

When further, the structure of said linear addressing scheme comprises linearity of more than one dimension, the term 'linear' being extended and comprising any multiple-dimensional, regularly structured arrangement of elements then, the concept is very flexible and vastly extendible. An example is a simple (m×n) matrix, i.e., its outer structure, of which each element may have an inner structure, e.g., when a matrix element comprises any kind of matrix-like arrangement, again one or more dimensional. This definition also comprises so-called self-similarity and thus recursively set-up structures.

Further, when each of the information packets comprises basically a reference for accessing respective use data which are buffered separately, the inventional concept is applied to a usual type within prior art switching technology which is particularly applied in the preferred embodiment described later below, too>.

When the inner part of the structure comprises FIFO storage elements, and the outer part of the structure is matrix-like, e.g., a matrix of FIFO devices, then, a double linear address arrangement is provided: first or inner level is provided by a 'linear' FIFO, in which addresses are stored regularly spaced and consecutively, the second or outer level is provided by a linear arrangement of said FIFO 'cells'. Thus, a self-managable and self-explanatory address distribution is provided which is easy to follow when filling up the matrix by a respective stream of elements.

Generally, in most cases the address calculation between any two consecutive address locations comprises as the only essential step the address incrementation by one offset increment. The 'stepsize' or 'incrementation length' of the offset is always individual and dependent of a variety of parameters individual to a specific storage implementation scheme.

Said inventive self-management advantageously avoids a feedback between any two consecutive stream elements as it is for example required by the prior art 'link list' approach in which reading the address information of a first stream element is required to locate the buffer location of a second stream element, immediately following said first one. Thus, said concept provides advantageously a scaling up to single-cycle activity in any pipelined operation state. Thus in every single cycle a whole set of input elements can be fed into the respective switching device and a whole set of output elements can be output from it.

Further, when one dimension of the above said linearity is used for implementing a plurality of lanes associable with one or more of said output ports then multiple priority lanes are supportable with an simple addressing scheme.

As hardware aspects are concerned, a chip circuit having means for performing the above characterized features advantageously has an input crossbar for addressing each of said plurality of m×n matrix elements for write, and it has an output crossbar for addressing each of said plurality of m×n matrix elements for read.

Basically a FIFO storage element is advantageously usable for said linear addressing scheme, and a plurality of linearly addressable FIFOs is used for said m×n matrix.

The chip described above can be advantageously incorporated in a network routing or switching element.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 1:
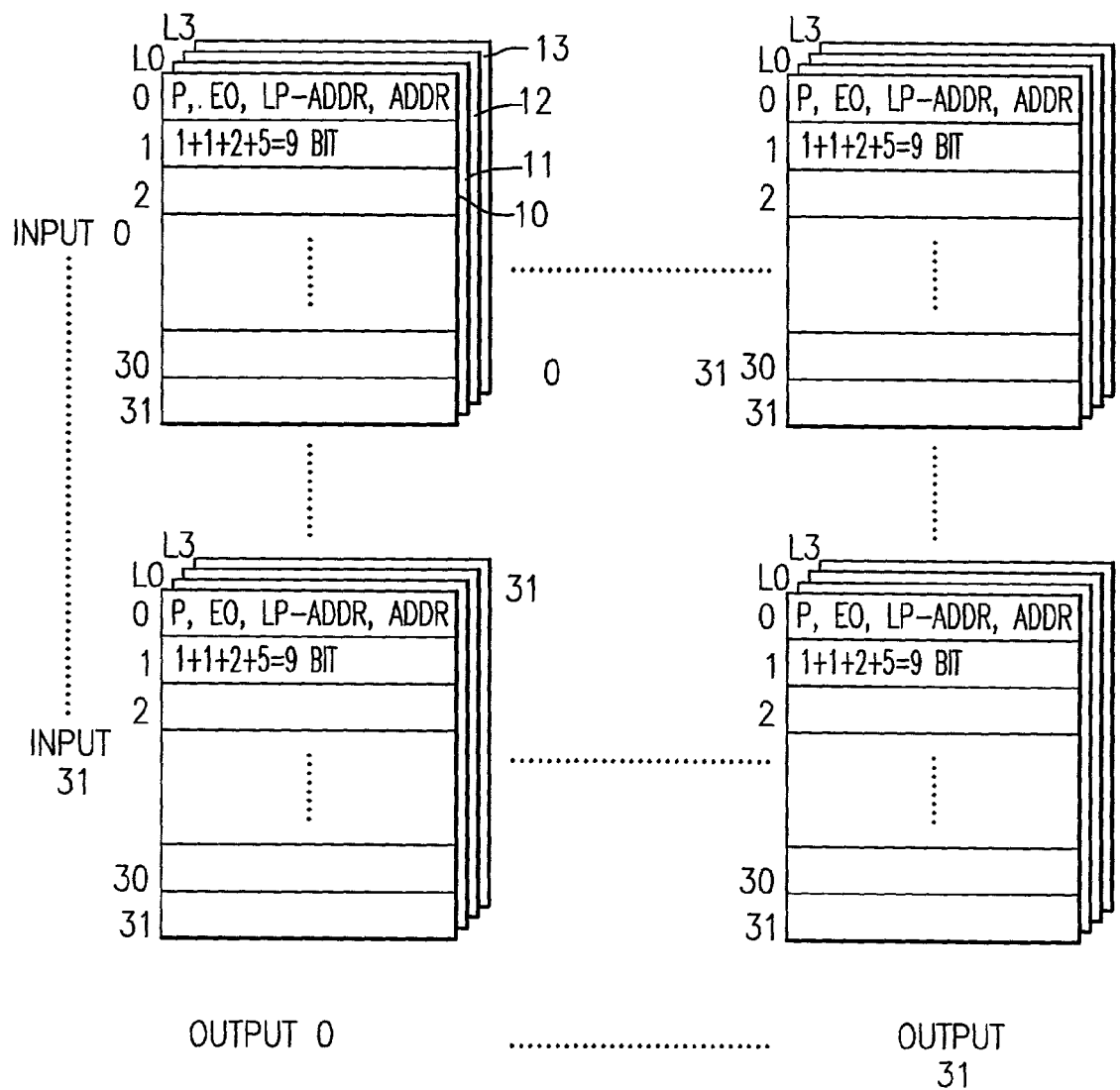
FIG. 1 is a schematic representation of the basic FIFO-based switching structure applied.

With general reference to the figures and with special reference now to FIG. 1 an example will be described providing a remarkable reduction of latency and the ability to operate with packets of a size down to one clock-cycle.

The examplary switching circuit embodiment described in here maintains the packet sequence for 32 input ports, 32 output ports, and supports 4 lanes. Each of the 32×32=1024 input/output crosspoints of which only the first (0) and the last (31) is depicted in the drawing can hold up to 32 packets per lane, which corresponds to a total of 4×32=128 packets. A lane denoted as L0, . . . L3, per crosspoint is depicted as one vertical 'slice', each. It should be noted that these parameters do not limit the scope of the invention.

FIG. 1 shows thus the basic structure in an overview form. Each input/output node (32×32=1K) holds 4 FIFOs, one FIFO for each lane (L0 . . . L3). The content of a FIFO entry is:

1 bit for parity.
1 bit for the EOF information (end of frame).
2 low order address bits of the input portnumber denoting from where the packet came. This is required to support the link paralleling feature. Later below, different ways of link paralleling are described in more detail, i.e., LP, 1-way, 2-way, 4-way LP.
5 address bits pointing to the location in the packet memory When a packet is read to an output port in case of no link paralleling being present, the prior art QoS (quality of service) table gives the desired lane. Then some arbitration mechanism decides, from which input port the packet should come (0 . . . 31). A read request is then activated to the respective FIFO and the oldest packets address in this FIFO is given. Then the packet itself is read out of the packet memory which is implemented separately. The next read request to this particular FIFO will then deliver the address of the next packet.

The case of link paralleling (LP mode) will be discussed with reference to FIG. 2.

Here, for example, two or four physical ports—input and/or output ports in case of LP2 or LP4, respectively, form one logical port. Thus there are cases of input LP and output LP and combinations of them, as e.g., 2/2, or 2/4, or 4/2, etc.

As a general requirement the sequence of the incoming/outgoing packets of such a logical port has to be maintained. By definition, the packet sequence is from the physical port with the lowest number (i.e. port 0) to the port with the highest number (i.e. port 1 if LP2, port 3 if LP4). This means, in case of input link paralleling, referred to herein as ILP, too, that two or even four packet addresses have to be written in the same clock-cycle.

In case of output LP (OLP), two or four packet addresses have to be read in the same cycle. Because each FIFO provides only one write and one read port, two or four FIFOs have to be used in case of LP mode. The packet addresses themselves have to be routed to/from the FIFOs in a way that keeps the packet sequence in order. This can be advantageously achieved by arranging the FIFOs in a round robin fashion.

Figure 2:
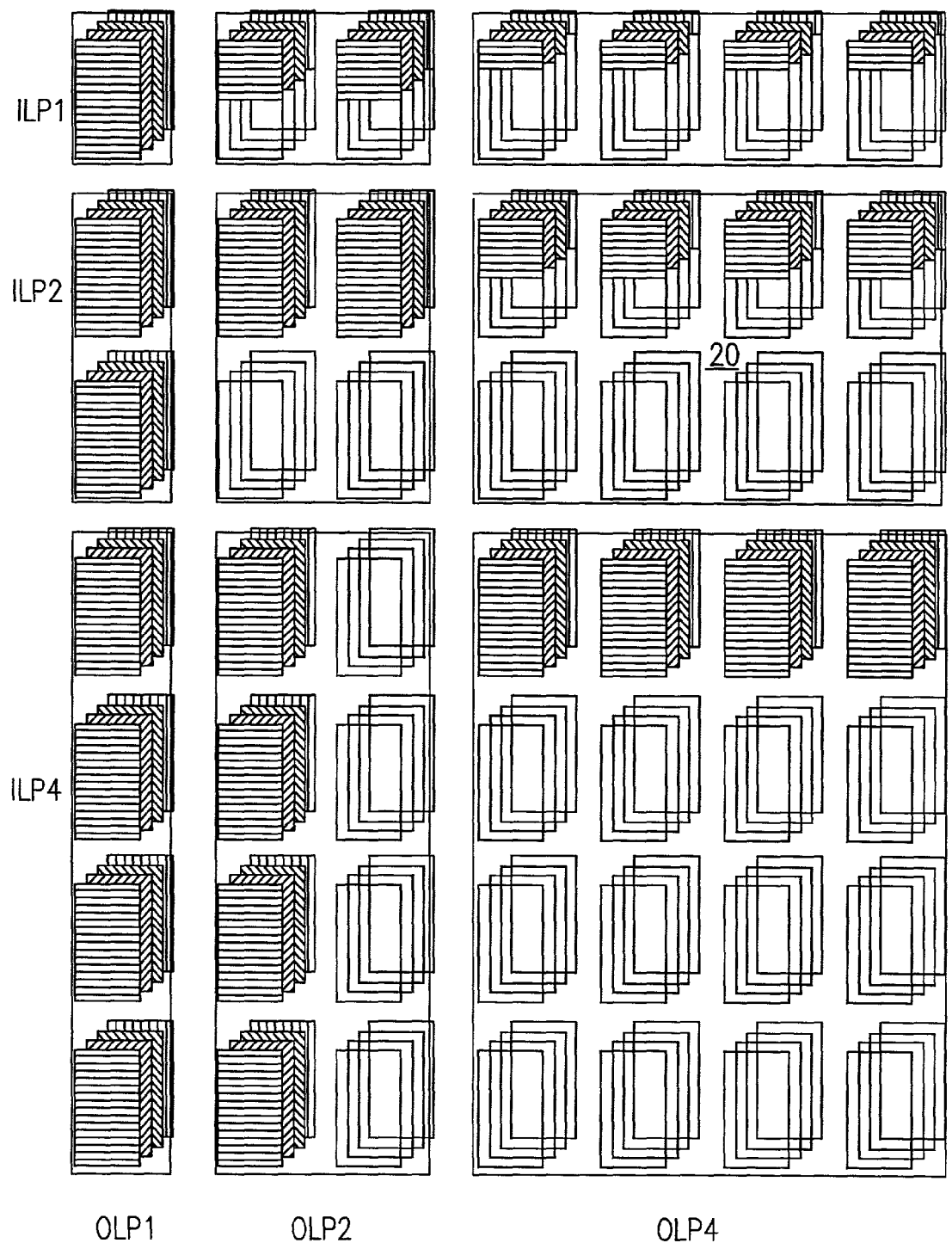
FIG. 2 is a schematic representation illustrating the usage of FIFOs for different link paralleling (LP) modes.

FIG. 2 shows the usage of the FIFOs for the different LP modes. In FIG. 2, different hatching patterns indicate different lanes. Horizontal=lane 0 (L0), diagonal-up=L1, diagonal-down=L2, and vertical=L.

Each FIFO can hold the packet addresses plus eof-bit plus parity-bit for an entire input port, in the case depicted here, 32 entries. Each FIFO, depicted a rectangular slice, each, has one write and one read port.

The link paralleling modes are from left to right OLP1, OLP2, OLP4 (OLP: output link paralleling). From top to bottom ILP1, ILP2, ILP4 (ILP: input LP).

The blank FIFOs are not used/required in a particular LP mode.

Combinations of LP-modes:

For example in row 2 column 3 (ILP2, OLP4)—section 20—the FIFOs work as follows, fulfilling the following requirements:

2-way LP at the input requires 2×32 packets (from two physical input ports) to be stored.
2-way LP at the input requires 2 FIFOs per lane, providing 2 write ports.
4-way LP at the output requires 4 FIFOs per lane, providing 4 read ports.

Operation:

Because of OLP4 (which is "more" than ILP2) four FIFOs per lane must be used, providing the two write and the four read ports. Thus, the FIFOs are used from left to right in the upper row of the concerned section 20, only. The remaining four FIFOs are not used in this mode.

The FIFOs are written by the two input ports in a round-robin fashion (independent for each lane), one write per FIFO per cycle.

Up to 16 entries in each of the FIFOs can be valid at any single point in time. There are 4×16 entries for 2×32 packet addresses.

The FIFOs (up to four) are read by the four output ports in a round-robin fashion independently for each lane, with one read per FIFO per cycle. The correct sequence of the packets is guaranteed by this mechanism.

The possible LP configurations are:
2-way:
    LP for ports 0–1, 2–3, 4–5, . . . , 30–31
4-way:
    LP for ports 0–3, 4–7, 8–11, . . . , 28–31

It should be noted that the LP mode for a particular port is active for the input and the output port. Therefore a cluster of four input ports and four output ports can be seen as the smallest unit that must be able to handle LP mode. It should be added that when (portnumber modulo 4)=0 yields the first physical port of the logical port.

Next, and with special reference to FIG. 3 the above mentioned 4I/4O port cluster will be described in more detail.

The cluster of four input ports and four output ports includes the FIFOs for sixteen possible input-output combinations. In order to universally support the diverse link paralleling modes, the scheme shown in FIG. 3 is used: Different hetching patterns indicate different logical input ports.

The incoming packets from different logical ports—said above said link—are shown on the left side and have different hatching patterns, as mentioned above, e.g., ILP4 has only one hatching pattern because of it's one single logical port.

Depending on the packets destination bitmap, the packet-address is stored in the FIFO of one or more output ports. As shown in FIG. 3, there are 5×5=25 different LP configurations for each cluster of 4×4 ports. The hatched rectangles show how the packet-addresses are stored, i.e., from which logical input port into which FIFO, and show also how many packet-addresses are possible per FIFO.

For example, no ILP, no OLP: i.e., see the upper left box 30 comprising 4 sub-rows: 100% packet addresses possible.

Further, no ILP and OLP2: i.e., the box depicted with reference sign 32. Here, 50% of the available packet addresses are possible since the incoming 32 packet addresses from input port 0 are spread over 2 FIFOs belonging to output port 0/1 working in OLP2 mode.

The blank FIFOs are not used/required in a particular configuration. Further storage schemes of the remaining ILP/OLP combinations can be directly seen from the figure and derived from the above explanations.

Figure 3:
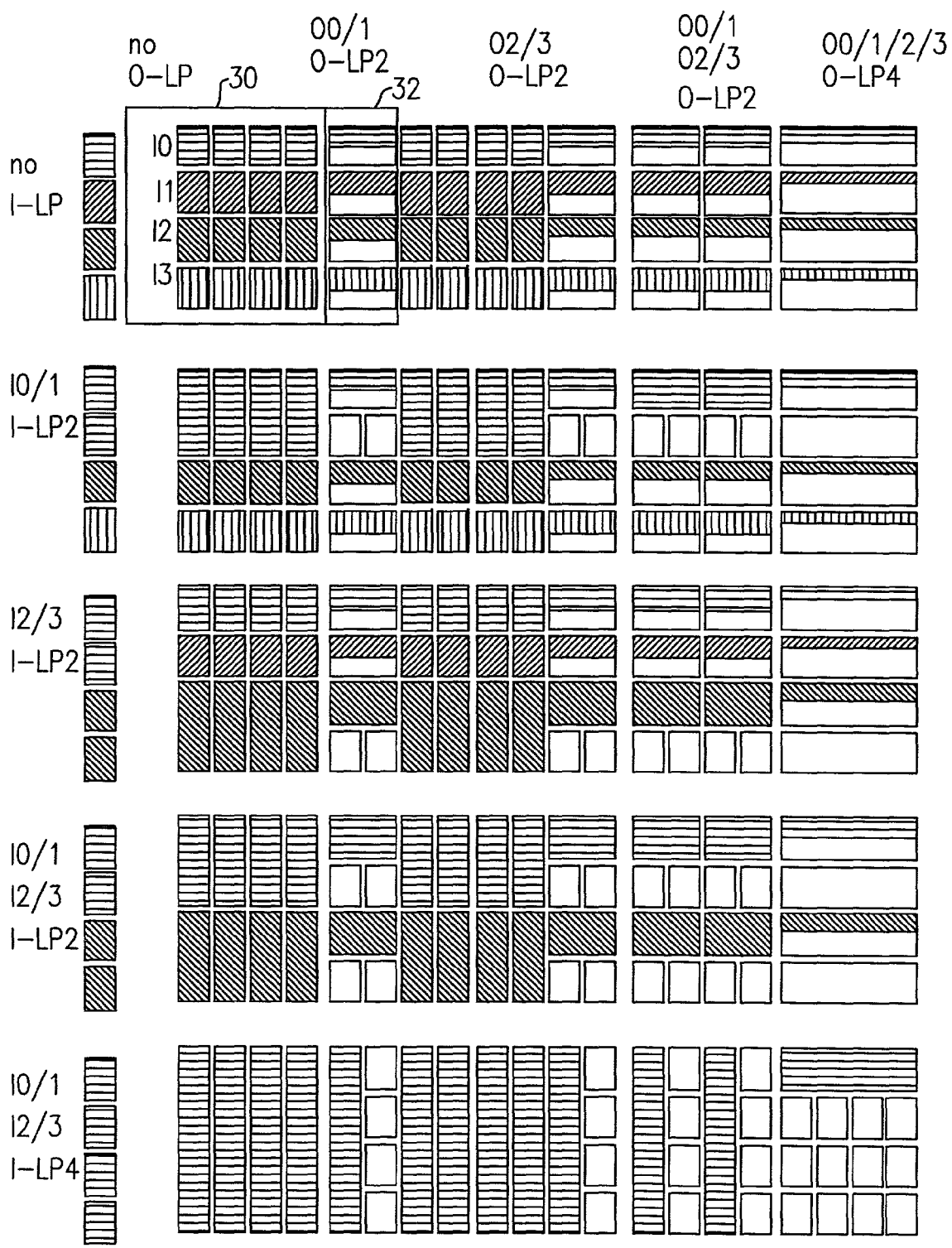
FIG. 3 is a schematic representation of a 4×4 cluster supporting all LP modes.
Figure 4:
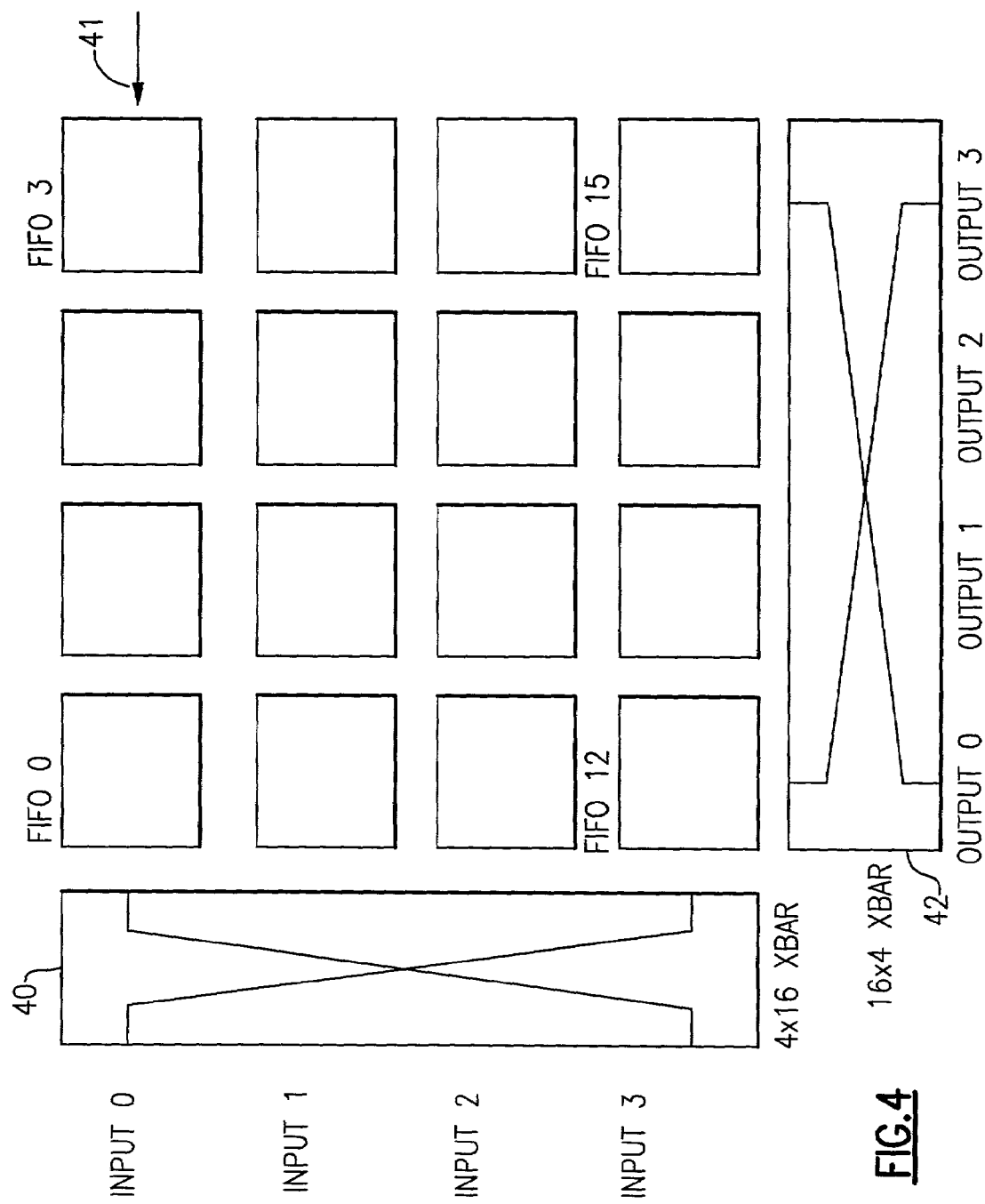
FIG. 4 is a schematic representation illustrating implementation details of the cluster shown in FIG. 3.
Figure 5A:
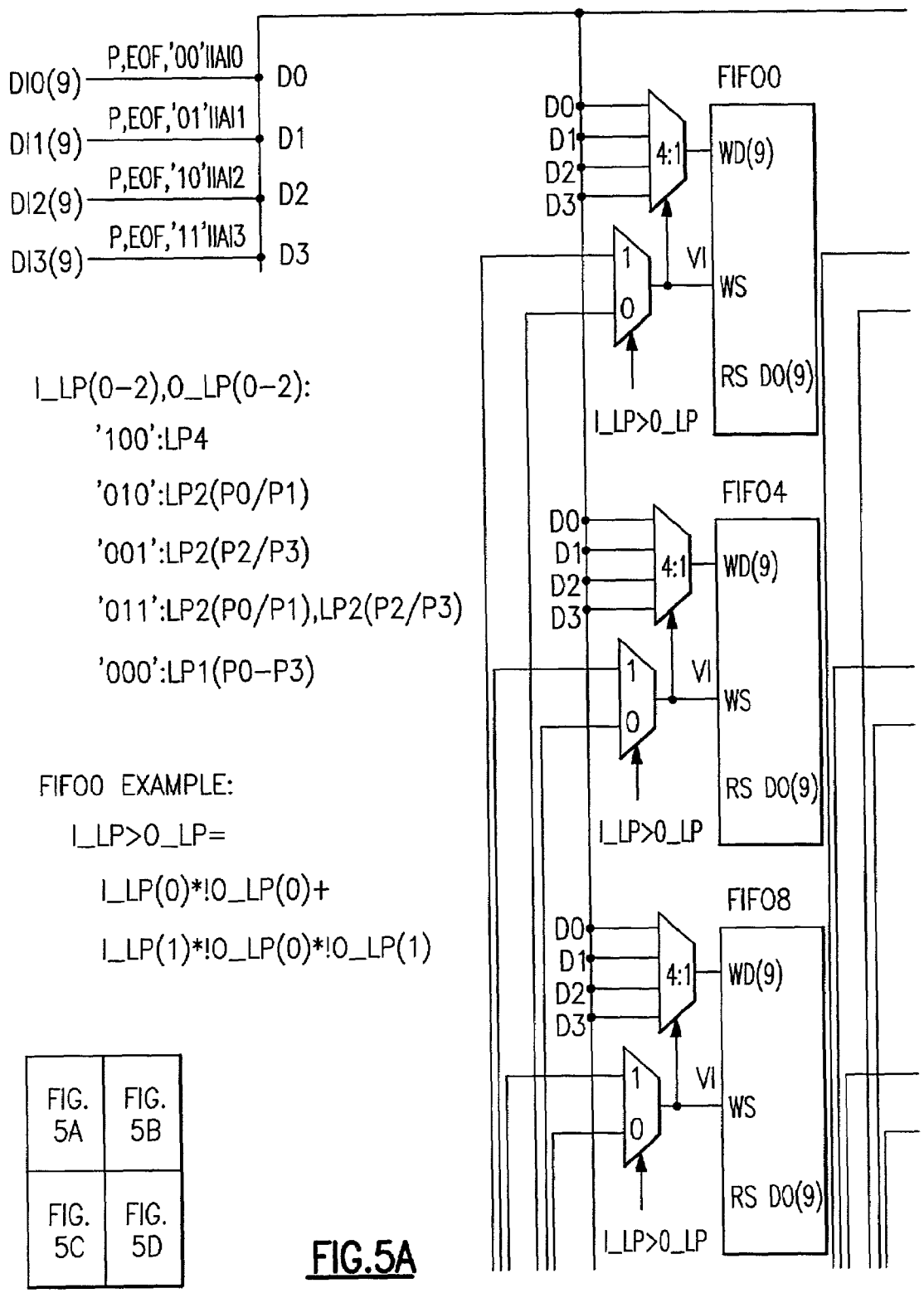
FIG. 5 is a schematic circuit representation of the switch.
Figure 5B:
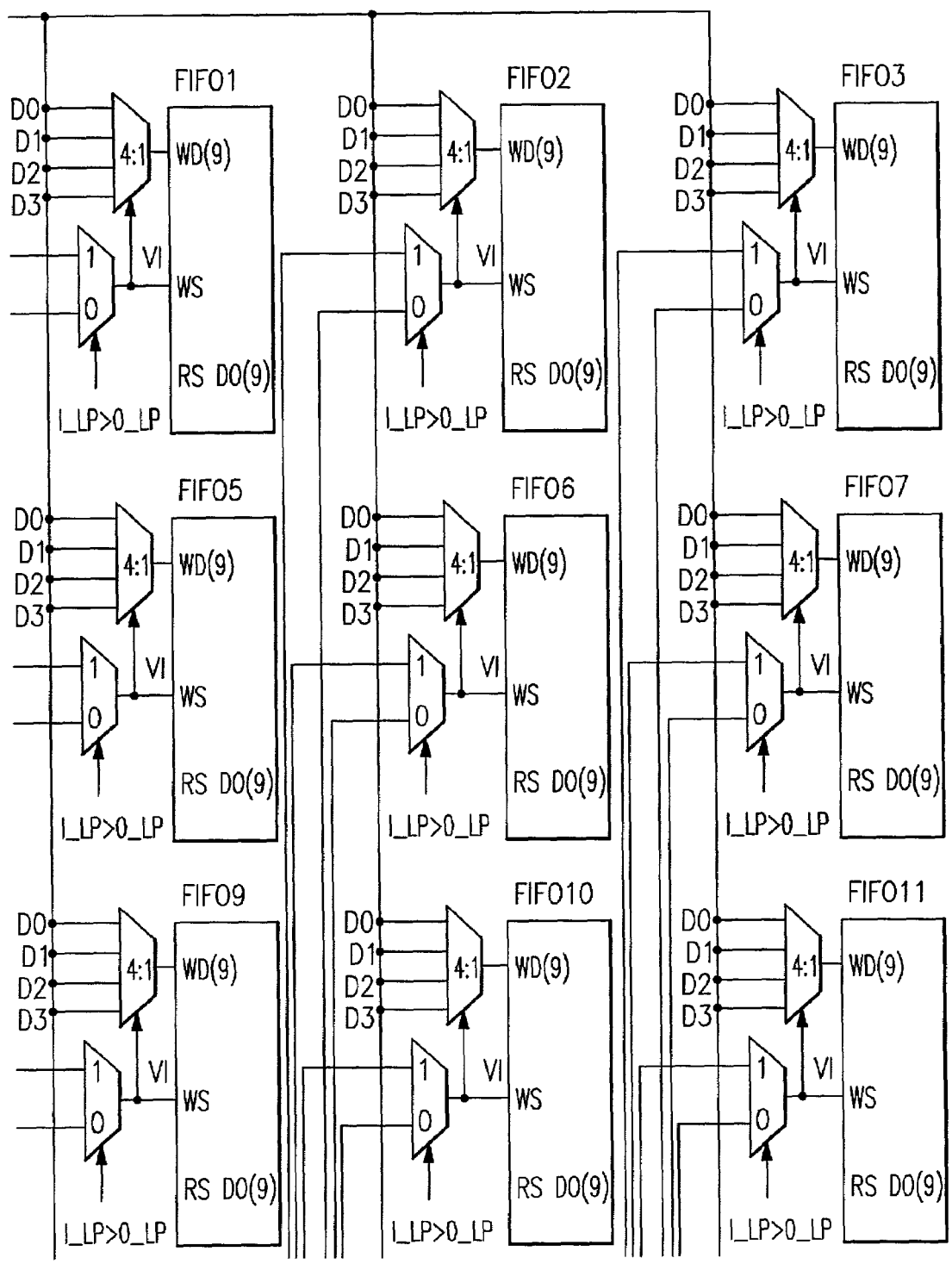
Figure 5C:
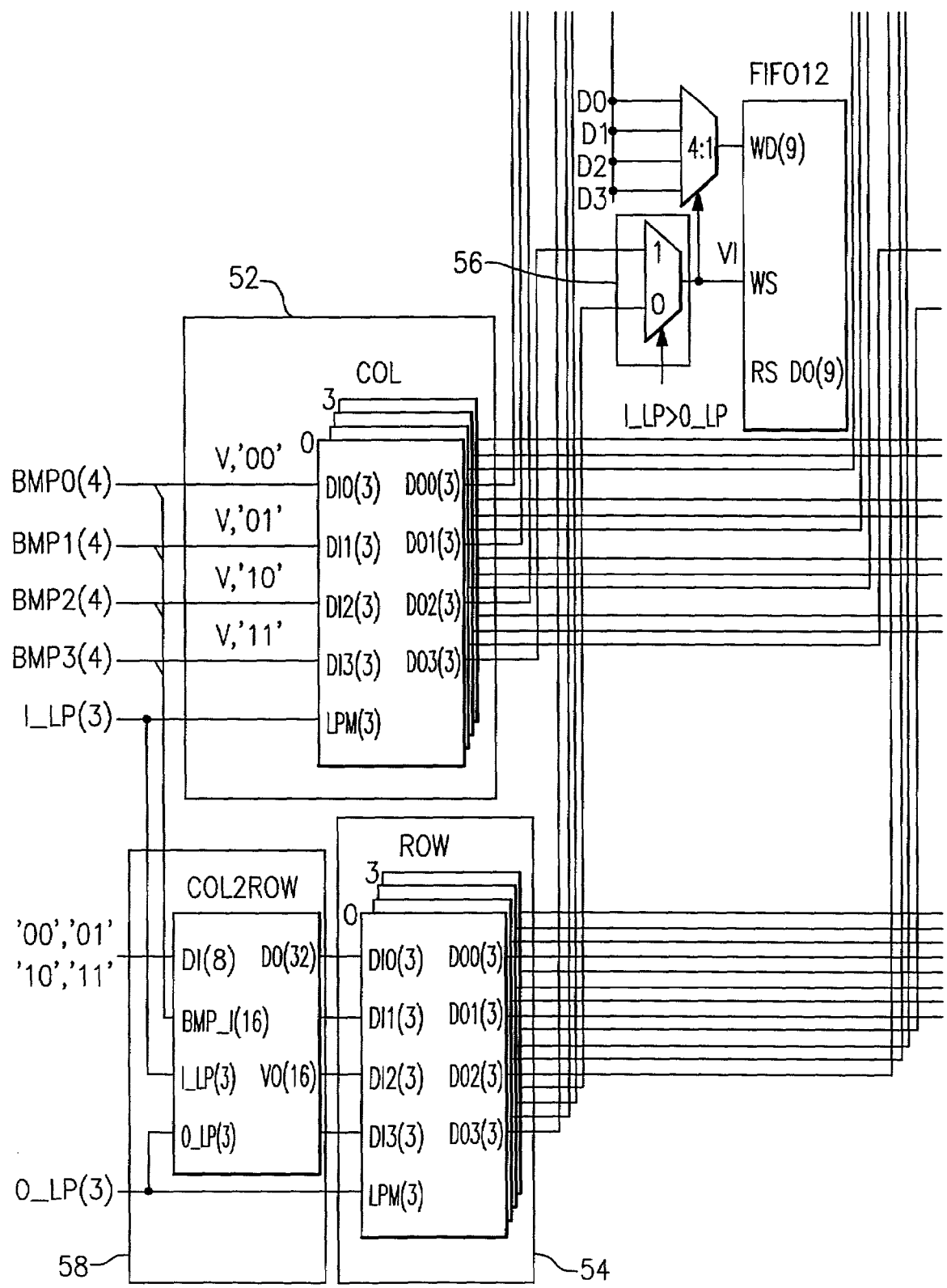
Figure 5D:
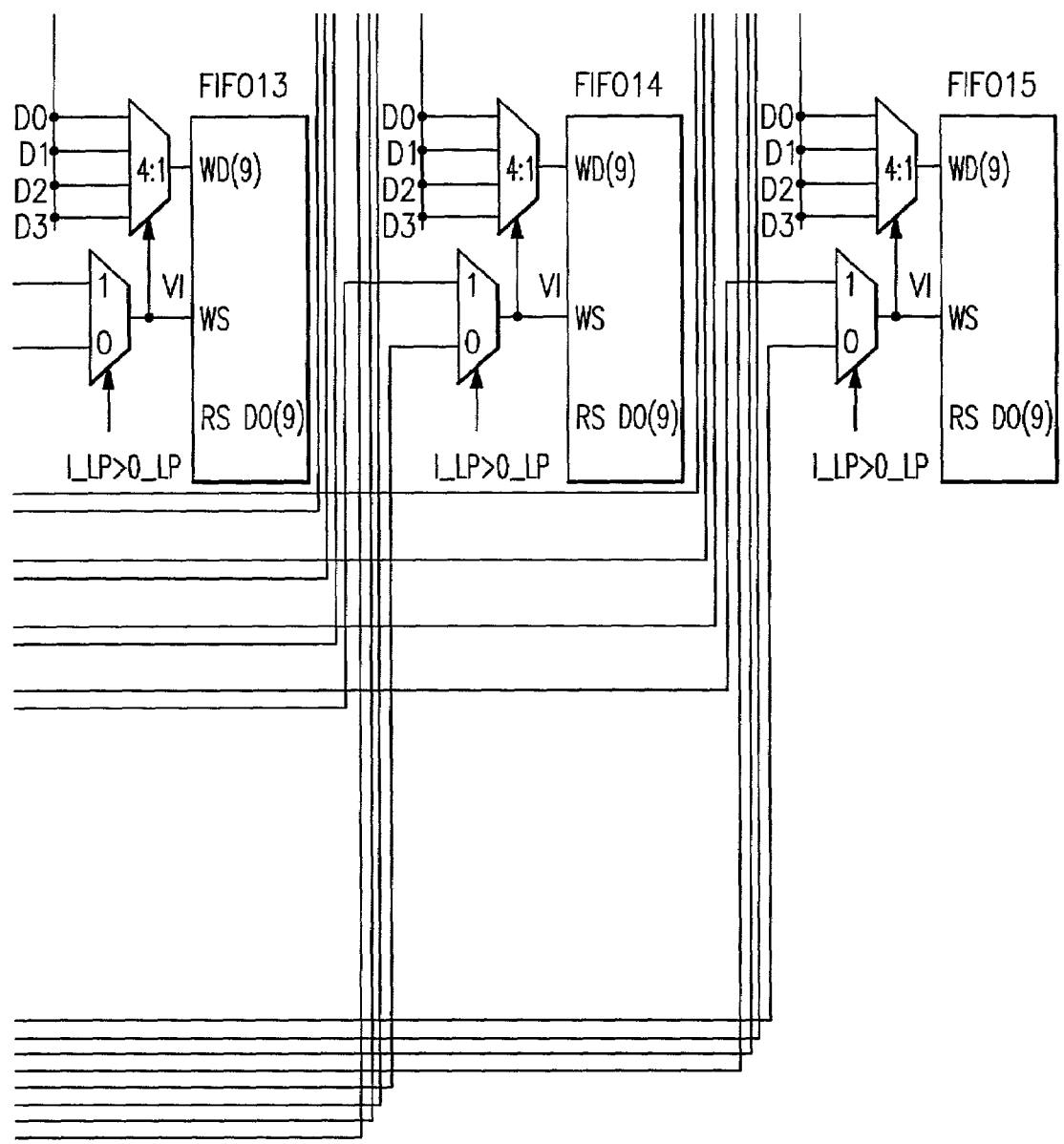

FIG. 4 is a schematic representation illustrating implementation details of the cluster shown in FIG. 3.

When writing into the structure, each incoming packet address is routed through a prior art non-blocking 4×16 crossbar. The determination of the target FIFO (0 ... 15), i.e., where to buffer the address information, depends on the input/output LP mode and, in case an LP mode is active, it depends on a set of "round-robin" write counters, for example to select FIFO 0 ... 3 in case of ILP1 for input port 0 and OLP4 for output ports 0 ... 3, see arc 41.

When reading from this structure, the sixteen FIFO data-outputs are routed through a 16×4 crossbar 42 such that each output can access each FIFO. Again, the LP mode and "round-robin" read counters determine which FIFO is accessed for a given output port.

It should be noted that the structure shown above is required for each lane, i.e., in the exemplary implementation four times. A total number of 8×8=64 of these structures (32/4=8 horizontal and 8 vertical) are required for the 32×32 switch.

The following sections describe the implementation of the 4×4 cluster.

There are basically 2 different ways to write the incoming data into the FIFOs:
vertically (columns), and
horizontally (rows).

The way in which the addresses are written essentially determines the way in which they are read out.

With additional reference to FIG. 5—which is a rough schematic circuit representation of the 4×4 FIFO cluster (the FIFOs being depicted as 16 rectangles)—the LP modes of the input ports and output ports decide, how the data is organized. To achieve this, according to an exemplary inventory embodiment a circuitry has been designed that generates the required information for each of the four columns and each of the four rows of the 4×4 cluster in parallel. These are the inventional "col" block 52 and "row" block 54 in the bottom left corner of FIG. 5 to which reference should now be made. Additionally, a further inventional circuitry, e.g., the gate 56 for each of the 4×4=16 FIFOs decides, whether the column or row information has to be used for a particular FIFO. Each of the latter gate is 'labeled' with "i_lp>o_lp" in front of each FIFO.

Each incoming packet gets an address in the range between 0.31 where it is stored into the input ports packet memory. Due to the before-mentioned link paralleling feature the 5-bit packet address gets two (encoding four different ports) additional bits, indicating from which input port the packet originates.

Additionally the packets EOF-bit from the packet header is required to correctly handle the requirements implied by the usual frame mode conventions. A parity bit (odd parity) for the 5+2+1=8 bits is generated. Odd parity means: if all 8 bits are zero, the parity bit is one). The four data fields d0 ... d3 (p: parity, eof: EOF-bit, '00' ... '11': 2-bit input port number, ai0. .. ai3: 5 bit packet memory address) belonging to four incoming data packets are routed over sixteen 4:1 multipexers arc 59, one in front of each FIFO in the 4×4 cluster. The decision which data field is selected by each of the sixteen multiplexers and is stored in which FIFO is made in the three blocks col 52, col2 row 58, and row 54.

Thus, some control information must be fed into those blocks 52, 54, 56 in order to make the correct target buffer determination. These inputs are depicted to come in at the left bottom corner in FIG. 5.

In particular, the packets bitmap field bmp0 ... bmp3, which encodes the target output port(s) for the packet, is used to generate the routing information. The fields bmp0 ... bmp3 are already pre-processed in regard of logical-to-physical port mapping, validation with lane-ID, filtering, etc. The field bmp0 for example has four bits, each bit validating the packet coming from input port 0 for one of the four output ports 0 ... 3.

Additionally the LP mode for the four connected input ports (i_lp) and the LP mode for the four connected output ports (o_lp) is passed to the structure. The three bit of these inputs are:

Bit 0:
LP4 mode if bit is set.
Bit 1:
LP2 mode for port 0 and 1 if bit is set.
Bit 2:
LP2 mode for port 2 and 3 if bit is set.
The valid combinations for i_lp and o_lp are:
'100':
LP4 mode for ports 0 ... 3.
'010':
LP2 mode for ports 0 ... 1, LP1 for ports 2 and 3.
'001':
LP2 mode for ports 2 ... 3, LP1 for ports 0 and 1.
'011':
LP2 mode for ports 0 ... 1 and LP2 mode for ports 2 ... 3.
'000':
LP1 mode for all four ports.

All other values are invalid. The information is provided by the application register section used to set up the switch configuration which in turn is out of the scope of the present invention.

Figure 6:
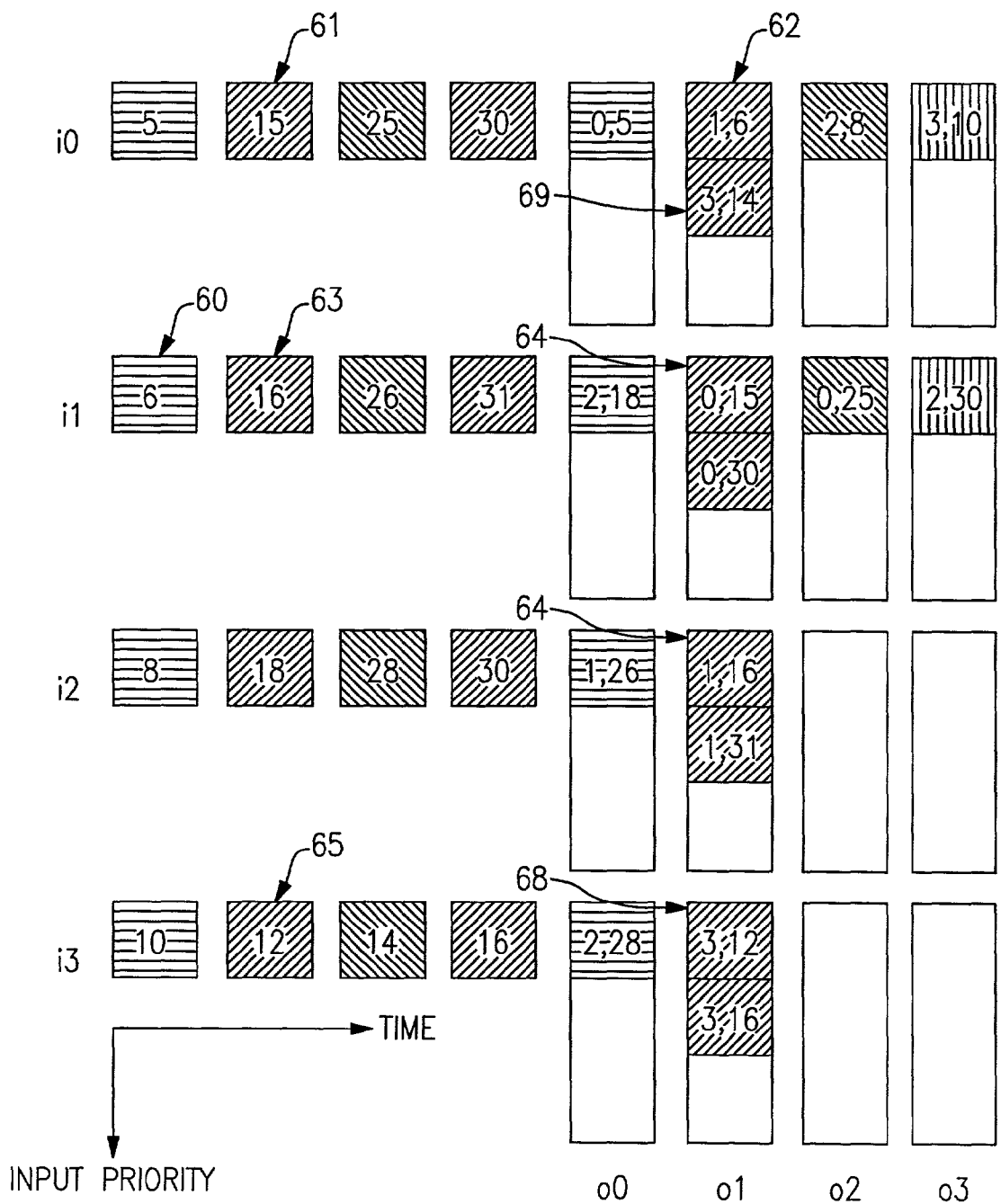
FIG. 6 is a schematic representation of illustrating the way in which block 52 depicted in FIG. 5 works.

Next and with additional reference to FIG. 6, the functions inside of the 'col' structure 52 will be described in more detail. This structure is available four times, as reveals from FIG. 5, for col0 (FIFOs 0, 4, 8, 12), col1 (FIFOs 1, 5, 9, 11), col2 (FIFOs 2, 6, 10, 12), and col3 (FIFOs 3, 7, 11, 15).

An example shows, how the "col" structure works. The left side shows the incoming packets with their memory address. Each input has space for 32 packets. Different hatching patterns indicate different output ports. Horizontal =output port 0, diagonal-up =output port 1, diagonal-down output port 2 and vertical =output port 3. The four input ports work in LP4 mode (four-way LP), the outputs in LP1 mode (no LP). The right side shows the 4×4=16 FIFOs (inputs 0 . . . 3, outputs 0 . . . 3).

The data that is stored into the FIFOs has the format x,y, where x is the input port number (0 . . . 3) and y is the packets memory address (0 . . . 31).

Next, an example illustrates the FIFO organization:

For simplification, only the diagonal-up hatched packets, going to output port 1 are of interest next:

In the first packet cycle, a packet arrives at input 1 and is stored in the packet memory of port 1 at address 6—arc 60. Assuming that the memory was empty before, the information 1,6 (input port number, memory address) is stored into the FIFO of the "diagonal-up hatched" output (output port 1) in row 0—arc 62—at address 0. It should be noted that ILP4 mode is active.

In the second packet cycle symbolized by the second left column of the left side in the figure, three packets, (0,15), (1,16), and (3,12) arrive. Due to ILP4 mode being active the packet 0,15—arc 64—is now stored into the FIFO in row 1 at address 0. The second packet 1,16 is stored in FIFO row 2 at address 0—arc 66. The third packet 3,12 arrives at FIFO row 3 address 0—see arc 68.

In the third packet cycle the packet (3,14) arrives at input port 3. It is routed to FIFO row 0 address 1, see arc 69.

Packet cycle four delivers three packets, (0,30), (1,31), and (3,16). Packet 0,30 goes to FIFO row 1 address 1, packet 1,31 goes to FIFO row 2 address 1, and packet 3,16 goes to FIFO row 3 address 1.

When the packet addresses are read out, the output port 1 starts with the first packet in FIFO row 0. This read request delivers the packet 1,6. The next read request delivers the first packet in FIFO row1, which is 0,15, and so on. Thus the sequence is maintained as it was required.

The routing of the read request to a FIFO depends on the input LP mode (where is the packet) and the output LP mode (how many reads per cycle).

Figure 7:
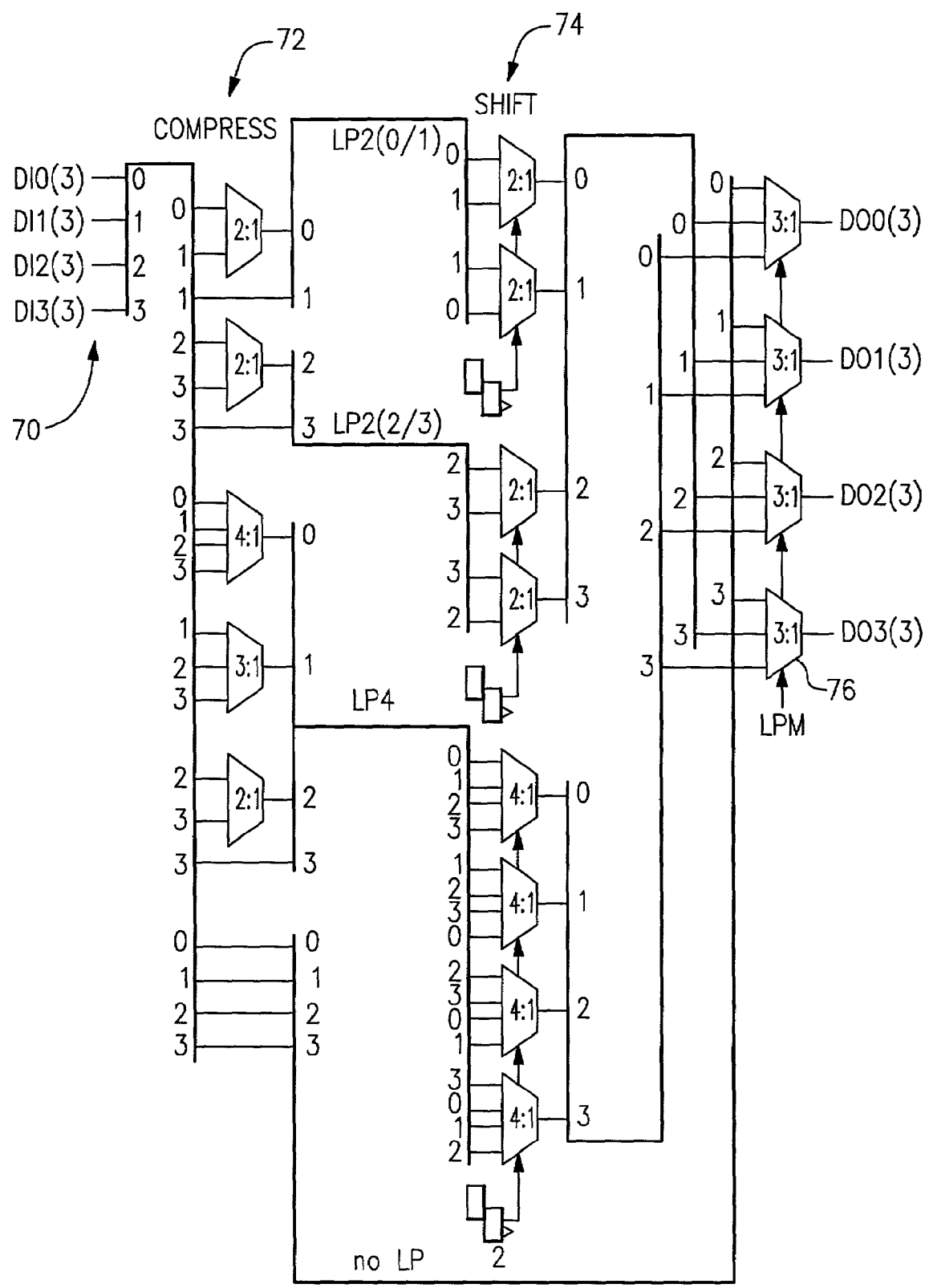
FIG. 7 is a schematic circuit representation of the block 52 of FIG. 5.

Next and with additional reference to FIG. 7, the generation of the routing information by the COL block 52 from the data-in (di in FIG. 5) to the FIFOs in one column is given below in more detail.

Each of the di-inputs (three bit)—see the left upper corner, arc 70—carries the following information:
One bit indicating valid data (the bitmap bit for the output port).
Two bits encoding the input port number (0 . . . 3) of the packet.

The compress stage—see arc 72—rearranges the four incoming data fields according to the LP mode.

In particular, in case no LP mode is set (all ports in LP1), the data bypasses this stage. In case of LP2 for ports 0 and 1 the first valid data-in di0/di1 is put on the first place, the second valid data-in on the second place. I.e., if di0 is not valid and di1 is valid, the output of the compress stage has di1 at position 0. The same is done for LP2 on ports 2 and 3.

In case of LP4 the same compression-scheme is applied to all four data-in vectors.

The compressed vectors must now be aligned such that the outgoing data uses the four FIFOs in a column in a self-explanatory, i.e., a linear scheme, here a round-robin scheme. This is done with the shift stages—see arc 74.

Therefore one latch is required for the LP2 mode (one for 0/1 and one for 2/3) so that the data can "toggle" through the connected two FIFOs, i.e. if port 0/1 are in LP2 mode and the last write (previous cycle) was to FIFO row 0, then the toggle latch routes the next write to FIFO row 1 and another following write again to FIFO row 0.

For the LP4 mode four FIFOs have to be controlled, therefore two latches are required to remember the last write position.

The compress and shift stage deliver three possible data-out vectors—for each of the four data fields:

One is for LP2, one for LP4, and one for LP1. The lpm-input 76 (three bit; bit0: LP4, bit1: LP2 (0/1), bit2: LP2 (2/3)) controls the 3:1 multiplexers such that the correct data-field is routed to the output.

Figure 8:
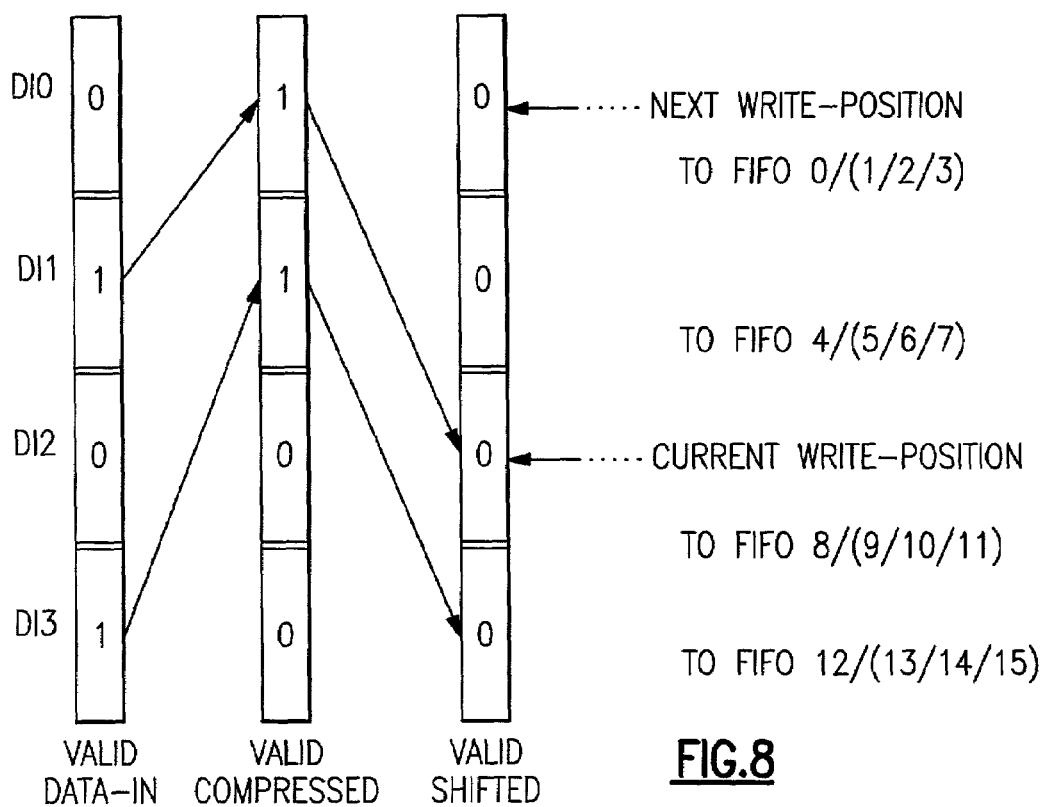
FIG. 8 is a schematic illustration showing the way in which the compress and shift stages of FIG. 7 work.

An example for the compress and shift function is illustrated by help of FIG. 8 next below.

Here, two inputs (di1 and di3) are valid for the column denoting the output port. The example is for four-way output LP (OLP4). It is further assumed that there were previous write operations to this output port such that the current write position is the third element, which symbolizes the FIFO in the third row of the 4×4 cluster. The two valid data-INs are written to the third and fourth FIFO of this particular output—that means in the same column—and the write pointer, giving the location for the next data-in, is advanced by two.

The above shown scheme is required for each of the four columns in the 4×4 cluster. It is also used with different input data for the four rows of the cluster.

The row block 54, see back to FIG. 5, is exactly the same as the col block. It just gets different inputs and the outputs feed four FIFOs in a row (instead of four FIFOs in a column).

The generation of the different inputs is done in the col2 row block 58.

Depending of the input and output LP modes for a given FIFO, the data is organized either in columns or rows, as shown before in FIG. 3.

Figure 9:
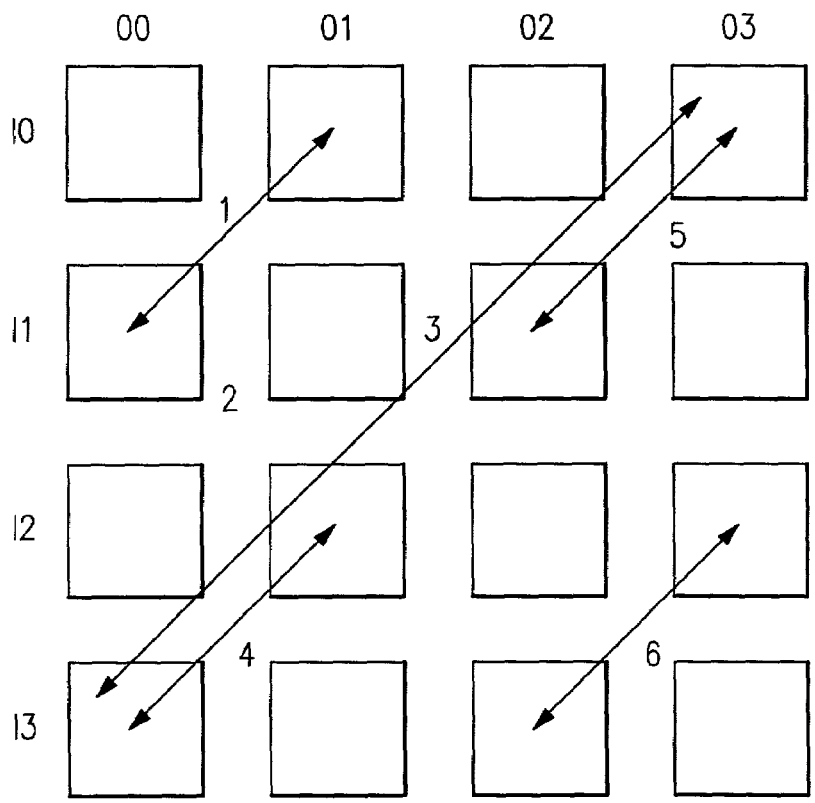
FIG. 9 is a schematic illustration showing the column to row mapping of the 4×4 cluster depicted in FIG. 4.

With reference back to FIG. 3, when looking at the vertical (column) and horizontal (row) rectangles it can be seen, that the mapping of the inputs to the four row-vectors (each with four elements) can be done by a simple matrix-operation. Thus, the row-information is generated by just mirroring the elements at the diagonals, as it is shown in FIG. 9.

Thus, as reveals from the above description a person skilled in the art should be able to appreciate the inventional disclosure in regard of it's scope, feasibility, and functionality.

The present invention can basically be realized in hardware, software, or a combination of hardware and software. The primary application, however will be a hardware implementation which is designed for lowest latency.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for switching information packets comprising:
   receiving an input stream of packets in a switching device, said switching device having said plurality of m input ports and a plurality of n output ports supporting link paralleling in which several ports are temporarily assembled into one logical port;
   temporarily buffering said packets according to a linear addressing scheme in which a respective buffer location of consecutive stream packets results from a respective linear incrementation of a buffer pointer for retrieving the address location of the next packet; and
   outputting the temporarily buffered packets to a plurality of said n output ports of said device according to predetermined rules specified by a programmable formula describing a linear context between any subsequent locations such that packets are processed in a pipeline on a single-cycle basis in which, in every cycle, packets are input and output, respectively.

2. The method according to claim 1 in which the structure of said linear addressing scheme comprises linearity of more than one dimension.

3. The method according to claim 1 in which each of the information packets comprises basically a reference for accessing respective use data which are buffered separately.

4. The method according to claim 2 in which the inner part of said structure comprises FIFO storage elements in which the data addresses for incoming packets are stored, and the outer part is matrix-like, which is preferably accessed in a Round-Robin way, said FIFO storage elements comprising a compilable register array with asynchronous write and read functions such that write and read pointers keep track of the next write and next read locations.

5. The method according to claim 2 in which one dimension is used for implementing a plurality of lanes associated with one or more of said output ports.

6. A chip circuit for switching information packets comprising:
   a switching device having a plurality of m input ports and a plurality of n output ports supporting link paralleling in which several ports are temporarily assembled into one logical port;
   said plurality of m input ports receiving an input stream of incoming packets;
   a plurality of buffers temporarily buffering said packets according to a linear addressing scheme in which a respective buffer location of consecutive stream packets results from a respective linear incrementation of a buffer pointer for retrieving the address location of the next packet; and
   said plurality of n output ports outputting the temporarily buffered packets according to predetermined rules specified by a programmable formula describing a linear context between any subsequent locations such that packets are processed in a pipeline on a single-cycle basis in which, in every cycle, packets are input and output, respectively.

7. The chip circuit according to claim 6 in which the structure of said linear addressing scheme comprises linearity of more than one dimension.

8. The chip circuit according to claim 6 in which each of the information packets comprises basically a reference for accessing respective use data which are buffered separately.

9. The chip circuit according to claim 6 in which the inner part of said structure comprises FIFO storage elements in which the data addresses for incoming packets are stored, and the outer part is matrix-like, which is preferably accessed in a Round-Robin way, said FIFO storage elements comprising a compliable register array with asynchronous write and read functions such that write and read pointers keep track of the next write and next read locations.

10. The chip circuit according to claim 7 in which one dimension is used for implementing a plurality of lanes associated with one or more of said output ports.

11. The chip circuit according to claim 6 wherein said m input ports and said n output ports form m×n matrix elements, and further having an input crossbar for addressing each of said plurality of m×n matrix elements for write, and having an output crossbar for addressing each of said plurality of m ×n matrix elements for read.

12. The chip circuit according to claim 6 in which a FIFO storage element is used for said linear addressing scheme.

13. The chip circuit according to claim 11 in which a plurality of linearly addressable FIFOs is used for said m×n matrix.

14. The chip circuit according claim 6 being incorporated in a network routing or switching element.

* * * * *